(12) United States Patent
Ray

(10) Patent No.: US 8,335,308 B2
(45) Date of Patent: Dec. 18, 2012

(54) METHOD, SYSTEM, AND APPARATUS FOR ATTENUATING DUAL-TONE MULTIPLE FREQUENCY CONFIRMATION TONES IN A TELEPHONE SET

(75) Inventor: Amar Nath Ray, Shawnee, KS (US)

(73) Assignee: CenturyLink Intellectual Property LLC, Denver, CO (US)

(*) Notice: Subject to any disclaimer, the term of this patent is extended or adjusted under 35 U.S.C. 154(b) by 1276 days.

(21) Appl. No.: 11/981,065

(22) Filed: Oct. 31, 2007

(65) Prior Publication Data

US 2009/0110183 A1 Apr. 30, 2009

(51) Int. Cl.
H04M 1/00 (2006.01)
H04M 3/00 (2006.01)
H04M 11/00 (2006.01)

(52) U.S. Cl. ............ 379/353; 379/93.28; 379/361; 379/418

(58) Field of Classification Search ............ 379/352, 379/418
See application file for complete search history.

(56) References Cited

U.S. PATENT DOCUMENTS

| | | | |
|---|---|---|---|
| 4,313,038 A | 1/1982 | Nilssen et al. | |
| 4,475,013 A * | 10/1984 | Lee et al. | 379/357.04 |
| 4,924,497 A | 5/1990 | Smith et al. | |
| 5,128,991 A * | 7/1992 | Murata | 379/361 |
| 5,960,072 A | 9/1999 | Hird et al. | |
| 6,463,138 B1 * | 10/2002 | Sherwood et al. | 379/142.14 |
| 6,961,424 B1 | 11/2005 | Vialle et al. | |
| 7,088,276 B1 * | 8/2006 | Wegener | 341/155 |
| 7,180,892 B1 | 2/2007 | Tackin | |
| 8,014,341 B1 | 9/2011 | Ray | |
| 2002/0090042 A1 | 7/2002 | Heinonen et al. | |
| 2002/0118824 A1 | 8/2002 | Yun | |
| 2002/0146112 A1 * | 10/2002 | Larson et al. | 379/356.01 |
| 2003/0177006 A1 | 9/2003 | Ichikawa et al. | |
| 2003/0194075 A1 * | 10/2003 | McGrath et al. | 379/218.01 |
| 2004/0052384 A1 | 3/2004 | Ashley et al. | |
| 2004/0196984 A1 | 10/2004 | Dame et al. | |
| 2004/0246862 A1 | 12/2004 | Cho et al. | |
| 2005/0027520 A1 | 2/2005 | Mattila et al. | |
| 2006/0029212 A1 | 2/2006 | Short et al. | |
| 2006/0106602 A1 * | 5/2006 | Caldwell et al. | 704/235 |
| 2006/0171521 A1 * | 8/2006 | Allen et al. | 379/219 |
| 2007/0165834 A1 | 7/2007 | Redman et al. | |
| 2007/0291916 A1 | 12/2007 | Oblad | |
| 2008/0304651 A1 | 12/2008 | Ray | |
| 2008/0304652 A1 | 12/2008 | Ray | |

OTHER PUBLICATIONS

Telstra Corporation, TelstraT1000S User Guide, copyright 2003.*
U.S. Appl. No. 11/897,906; Supplemental Notice of Allowance dated Apr. 9, 2012; 3 pages.
U.S. Appl. No. 11/810,629; Final Rejection dated Jul. 21, 2011; 15 pages.

(Continued)

*Primary Examiner* — Fan Tsang
*Assistant Examiner* — Jeffrey Lytle
(74) *Attorney, Agent, or Firm* — Swanson & Bratschun, L.L.C.

(57) ABSTRACT

A method, system, and apparatus for attenuating a dialing confirmation tone includes receiving an enable signal from a tactile user input device, generating at least one dual-tone multiple frequency (DTMF) tone, and communicating the at least one DTMF tone to a telephone line. The method further includes attenuating a signal level of the at least one DTMF tone by a predetermined amount to produce at least one attenuated dialing confirmation tone in response to receiving the enable signal, and communicating the at least one attenuated dialing confirmation tone to an audio output device.

18 Claims, 2 Drawing Sheets

OTHER PUBLICATIONS

U.S. Appl. No. 11/810,629; Non-Final Rejection dated Jan. 24, 2011; 13 pages.
U.S. Appl. No. 11/824,185; Non Final Office Action dated Dec. 7, 2011; 10 pages.
U.S. Appl. No. 11/824,185; Non Final Rejection dated Jun. 8, 2012; 14 pages.
U.S. Appl. No. 11/897,762; Final Office Action dated Feb. 10, 2012; 21 pages.
U.S. Appl. No. 11/897,906; Issue Notification dated May 16, 2012; 1 page.
U.S. Appl. No. 11/897,906; Notice of Allowance dated Feb. 17, 2012; 12 pages.
U.S. Appl. No. 12/146,876; Final Office Action dated Feb. 15, 2012; 14 pages.

* cited by examiner

METHOD, SYSTEM, AND APPARATUS FOR ATTENUATING DUAL-TONE MULTIPLE FREQUENCY CONFIRMATION TONES IN A TELEPHONE SET

BACKGROUND

Dual-Tone Multiple Frequency (DTMF) tones are required for dialing out and/or initiating a telephone call from a telephone set. DTMF signaling is used for telephone signaling from a telephone set over a telephone line to a call switching center. The DTMH signaling occurs in the voice-frequency band. During a dialing process by a user using touch-tone keys, the telephone set generates dialing confirmation tones that are played through the receiver earpiece of the telephone set so that dialing confirmation tones may be heard by the user. The dialing confirmation tones are intended for user convenience so that the user of the telephone set will be able to confirm that the telephone set has received the touch-tone key press. However, the loudness and duration of the dialing confirmation tones vary from one telephone set to another. Loud dialing confirmation tones may cause annoyance to a user, as well as be a disturbance to others. For example, in a calm and quiet environment, loud DTMF dialing confirmation tones may disturb the privacy of others in the environment.

Continuous DTMF tones are required for some specific continuous operations, such as through remote access applications. For example, through remote access, a user needs to press and hold a specific key for a certain period of time to generate and send continuous tones in order to delete all stored messages in a remote voice mail system mailbox. In such situations, the dialing confirmation tones may be even more objectionable to the user.

SUMMARY

Embodiments of the present invention provide for a method, system, and apparatus for attenuating and/or muting a dialing confirmation tone of a telephone set.

A method for attenuating a dialing confirmation tone according to one embodiment includes receiving an enable signal from a tactile user input device, generating at least one dual-tone multiple frequency (DTMF) tone, and communicating the at least one DTMF tone to a telephone line. The method further includes attenuating a signal level of the at least one DTMF tone by a predetermined amount to produce at least one attenuated dialing confirmation tone in response to receiving the enable signal, and communicating the at least one attenuated dialing confirmation tone to an audio output device.

An apparatus for apparatus for attenuating a dialing confirmation tone according to another embodiment includes a dialing tone generator configured to generate at least one dual-tone multiple frequency (DTMF) tone, and provide the at least one DTMF tone to a telephone line. The apparatus further includes a confirmation tone attenuator configured, in a first mode of operation, to receive an enable signal from a tactile user input device, attenuate a signal level of the at least one DTMF tone by a predetermined amount to produce at least one attenuated dialing confirmation tone in response to receiving the enable signal, and provide the at least one attenuated dialing confirmation tone to an audio output device.

According to still another embodiment, a computer usable program product in a computer readable medium storing computer executable instructions for attenuating a dialing confirmation tone, when executed, cause at least one processor to receive an enable signal from a tactile user input device, generate at least one dual-tone multiple frequency (DTMF) tone, and provide the at least one DTMF tone to a telephone line. The executable instructions further cause the at least one processor to attenuate a signal level of the at least one DTMF tone by a predetermined amount to produce at least one attenuated dialing confirmation tone in response to receiving the enable signal, and provide the at least one attenuated dialing confirmation tone to an audio output device.

DESCRIPTION OF THE DRAWINGS

A more complete understanding of the method and apparatus of the principles of the present invention may be obtained by reference to the following Detailed Description when taken in conjunction with the accompanying Drawings wherein.

DETAILED DESCRIPTION OF DRAWINGS

Various embodiments of the present invention provide for a user of a telecommunication device, such as a telephone set, to attenuate and/or mute a dialing confirmation tone. In a particular embodiment, the dialing confirmation tone is a dual-tone multiple frequency (DTMF) confirmation tone. In accordance with various embodiments, the telecommunication device is a telephone set coupled to a plain old telephone service (POTS) or public switched telephone network (PSTN). In a particular embodiment, the telecommunication device is coupled to an analog line of a telecommunication network. In various embodiments, a user is provided with the option on the telephone set of attenuating the volume level of the dialing confirmation tones provided to an earpiece or speaker of the telephone set when desired by the user. In a particular embodiment, the telephone set is provided with a hard key. When the hard key is pressed by a user, any dialing confirmation tones provided to the earpiece are attenuated. In another embodiment, the telephone set is provided with a program mode in which the telephone set is placed into a confirmation tone attenuation mode or mute mode whenever a particular sequence is entered by the user on the touch pad of the telephone set. In the confirmation tone attenuation mode, any dialing confirmation tones provided to the earpiece of the telephone set are attenuated. The description that follows is directed to one or more embodiments, and should not be construed as limiting in nature.

Figure 1:
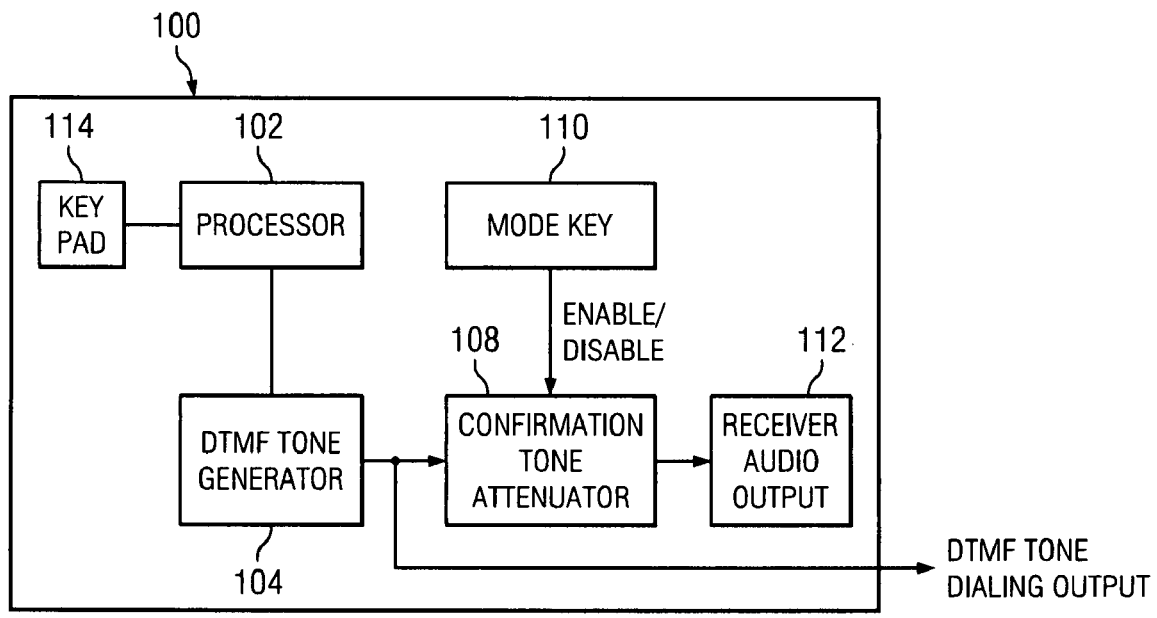
FIG. 1 is an illustration of an apparatus for attenuating a dialing confirmation tone in accordance with an embodiment of the invention.

FIG. 1 is an illustration of an apparatus for attenuating a dialing confirmation tone in accordance with an embodiment of the invention. For the purposes of this description, attenuation may include muting the dialing confirmation tones through attenuating the DTMF signals to a level at which the signals are inaudible or preventing the DTMF signals from being communicated to the earpiece or speaker. A telephone set 100 may include a processor 102, a dual-tone multiple frequency (DTMF) tone generator 104, a confirmation tone attenuator 108, a mode key 110, and a key pad 114. In various embodiments, the telephone set 100 may included a corded telephone set coupled to a telephone line or a cordless telephone set having an associated base unit coupled to a telephone line. In various embodiments, the telephone set 100 may include either a digital or analog telephone set. The key pad 114 is coupled to the processor 102, and the processor 102 is further coupled to an input of the DTMF tone generator 104. An output of the DTMF tone generator 104 is coupled a DTMF tone dialing output 106 and an input of the confirmation tone attenuator 108. An output of the confirmation tone attenuator 108 is coupled to a receiver audio output 112 of the telephone set 100. In at least one embodiment, the receiver audio output 112 is coupled to an earpiece in a receiver of the telephone set 100. In other embodiments, the receiver audio output 112 is coupled to a headset coupled to the telephone set 100. In still other embodiments, the receiver audio output 112 may be coupled to any other type of audio output device. The mode key 110 is coupled to the confirmation tone attenuator 108 and provides an enable/disable signal to the confirmation tone attenuator 108 from the mode key 110 responsive to user input. In at least one embodiment, the mode key 110 is a key or button mounted on the telephone set 100. In other embodiments, the mode key 110 is a part of the keypad 114. Although the illustrated embodiment describes the use of a mode key 110 for user input, it should be understood that other embodiments may use other types of tactile user input devices to send the enable/disable signal to the confirmation tone attenuator 108. In accordance with various embodiments, a tactile user input device is an input device that is operated by touch by a user.

In an example mode of operation, a user of the telephone set 100 presses the mode key 110, and the mode key 110 provides an enable signal to the confirmation tone attenuator 108. In response to receiving the enable signal, the confirmation tone attenuator 108 is placed in a confirmation tone attenuation mode. To initiate the call, the user presses one or more keys on the key pad 114. In response to each key press, the processor 102 instructs the DTMF tone generator 104 to generate DTMF tones corresponding to the key press. The DTMF tones are provided to the DTMF tone dialing output 106 and the input of the confirmation tone attenuator 108, which attenuates the DTMF tones prior to being communicated to the receiver audio output 112. The DTMF tone dialing output 106 is coupled to the telephone line, and the DTMF tones provided to the DTMF tone dialing output 106 are transmitted over the telephone line to a switching center to connect the telephone call. Although the embodiment of FIG. 1 is illustrated as using DTMF tone generator 104, it should be understood that other types of dialing tone generators could be used in other embodiments.

More particularly, in the confirmation tone attenuation mode, a signal level of the DTMF tones provided to the input of the confirmation tone attenuator 108 are attenuated by a predetermined amount by the confirmation tone attenuator 108 to generate attenuated dialing confirmation tones. The attenuated dialing confirmation tones are output by the confirmation tone attenuator 108 to the receiver audio output 112. The procedure is repeated for each key press by the user on the key pad 114. In at least one embodiment of the invention, the confirmation tone generator 108 attenuates the DTMF tones by at least 50 dB to 60 dB compared to the signal level of the generated DTMF tones to produce the attenuated dialing confirmation tones. In a particular embodiment, the signal level of the attenuated dialing confirmation tones produced by the confirmation tone generator 108 are attenuated to an amount such that the attenuated dialing confirmation tones are substantially imperceptible to the user of the telephone set 100. In an alternative embodiment, an attenuation level of the dialing confirmation tones is selectable by the user of the telephone set 100 via one or more keys, knobs, or other input elements. In still another alternative embodiment, the confirmation tone attenuator 108 may function to electrically disconnect the output of the DTMF tone generator 104 from the receiver audio output 112 such that no dialing confirmation tones are provided to the receiver audio output 112. In this alternative embodiment, the dialing confirmation tones may be referred to as muted.

If the user again presses the mode key 110, the mode key 110 provides a disable signal to the confirmation tone attenuator 108. In response to receiving the disable signal, the confirmation tone attenuator 108 is placed in a normal mode. In the normal mode, the DTMF tones produced by the DTMF tone generator 104 are not attenuated by the confirmation tone generator 108, and the dialing confirmation tones are provided to the receiver audio output 112 at substantially the same signal level as the generated DTMF tone. An example of a situation in which a user may wish to return to the normal mode during an established call is when a user wishes to forward the established call to an automated key pad response system where the DTMF confirmation tone is desired to be heard. In accordance with various embodiments, the telephone set 100 returns to the normal mode 110 automatically after a call has ended. In various embodiments, the default mode of the telephone set 100 is the normal mode.

In at least one embodiment, the telephone set 100 includes an indication of the current mode of the confirmation tone attenuator 108. In one embodiment, the telephone set 100 includes an attenuation indicator such as a status light, a single or multi-color light emitting diode (LED), that indicates whether the confirmation tone attenuation mode is activated. In another embodiment, the telephone set 100 is provided with a display that indicates whether the confirmation tone attenuator 108 is in the normal mode or the confirmation tone attenuation mode.

It should be understood that one or more of the DTMF tone generator 104 and the confirmation tone attenuator 108 can include hardware components, software components or a combination of hardware and software components.

Figure 2:
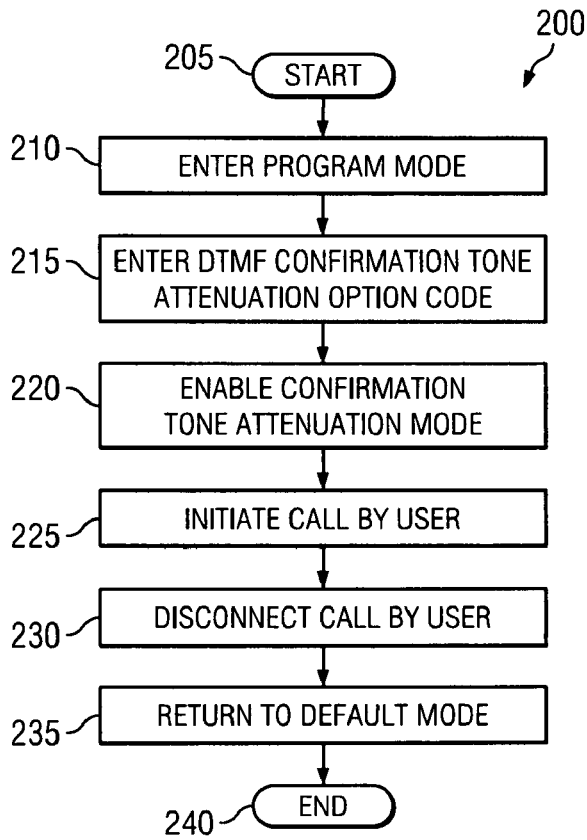
FIG. 2 is an illustration of an embodiment of a procedure for attenuating a dialing confirmation tone.

FIG. 2 is an illustration of an embodiment of a procedure for attenuating a dialing confirmation tone. The procedure 200 starts in step 205 in which the confirmation tone attenuator 108 begins in the normal mode in which dialing confirmation tones are not attenuated. In step 210, the user puts the telephone set 100 into a program mode. In various embodiments, the user may put the telephone set 100 into the program mode by pushing one or more keys on the key pad 114. In step 215, the user enters a DTMF confirmation tone attenuation option code using the key pad 114 to enable the confirmation tone attenuate mode. In a particular embodiment, the user enters at least two digits before the confirmation tone attenuator 108 enters the confirmation tone attenuation mode. In step 220, the confirmation tone attenuation mode is enabled in response to the entering of the DTMF confirmation tone attenuation option code by the user. In the confirmation tone attenuation mode, the signal level of DTMF tones provided to the input of the confirmation tone attenuator 108 are attenuated by a predetermined level by the confirmation tone attenuator 108 to generate attenuated dialing confirmation tones. The attenuated dialing confirmation tones are output by the confirmation tone attenuator 108 to the receiver audio output 112. In an alternative embodiment, the confirmation tone attenuator 108 may function to electrically disconnect the output of the DTMF tone generator 104 from the receiver audio output 112 such that no dialing confirmation tones are provided to the receiver audio output 112.

In step 225, the user of the telephone set 100 initiates a telephone call by dialing on the key pad 114. In response to the telephone set 100 being in the confirmation tone attenuation mode, the dialing confirmation tones generated by the user dialing on the key pad 114 and presented to the user via the earpiece are attenuated. During the telephone call, any dialing confirmation tones generated by the user pressing any keys on the key pad 114 will continue to be attenuated. In step 230, the call is disconnected by the user hanging up the telephone set 100. Alternately, the call can be disconnected by a called party disconnection of the call. In step 235, the telephone set 100 returns to the default mode. In the default mode, DTMF tones generated by the DTMF tone generator 104 are not attenuated by the confirmation tone generator 108, and the dialing confirmation tones are provided to the receiver audio output 112 at substantially the same signal level as the generated DTMF tone. In an alternative embodiment, step 235 is omitted and the telephone set 100 remains in the confirmation tone attenuation mode until the user changes the mode to the default mode. The procedure 200 ends in step 240.

The various steps of procedure 200 have been chosen and described only as exemplary and are not limiting on the illustrative embodiments. An implementation of the illustrative embodiments may alter, combine, delete or augment these steps without departing from the scope of the illustrative embodiments.

Figure 3:
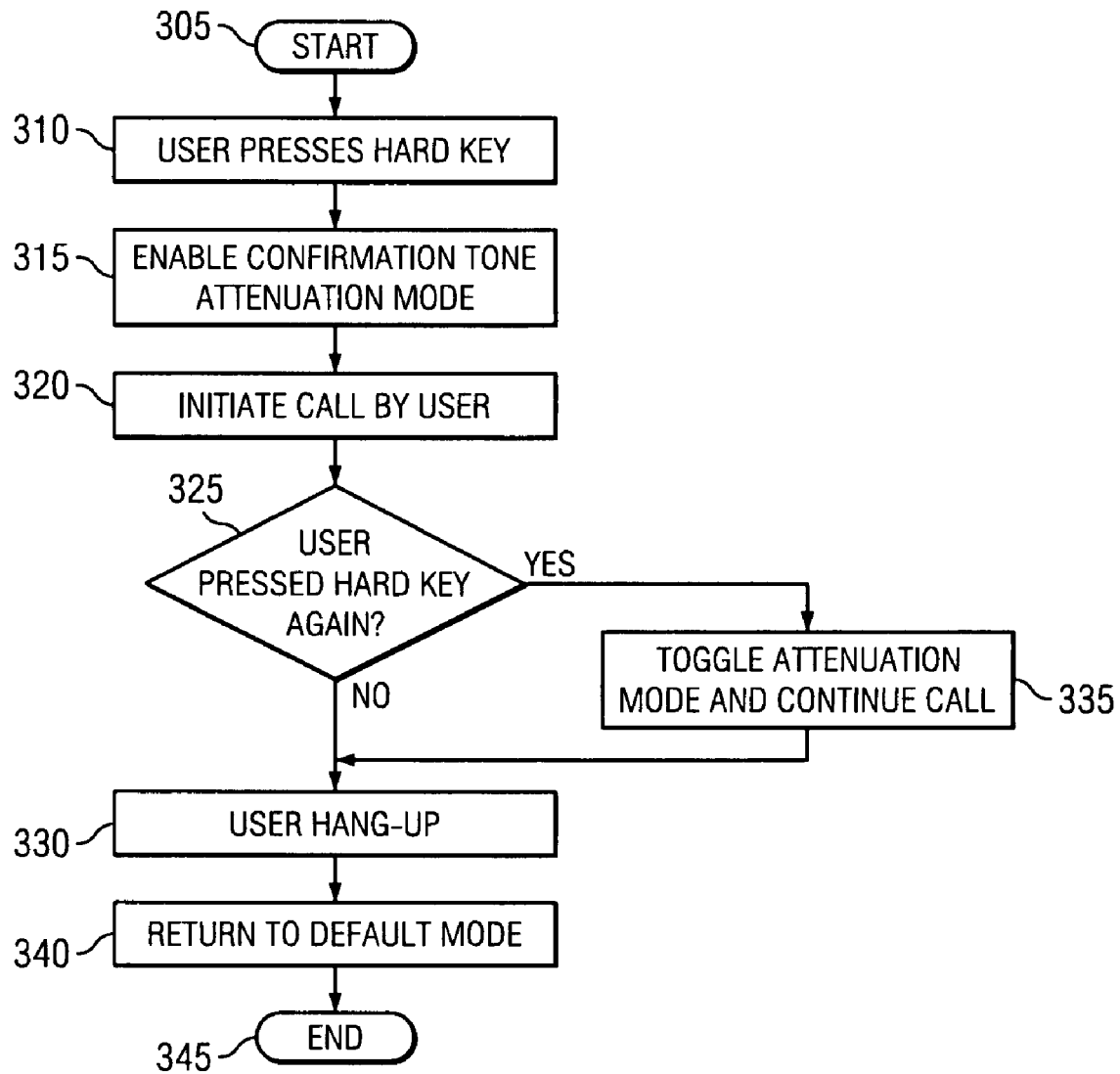
FIG. 3 is an illustration of another embodiment of a procedure for attenuating a dialing confirmation tone.

FIG. 3 is an illustration of another embodiment of a procedure for attenuating a dialing confirmation tone. The procedure 300 starts at step 305. At step 310, a user of the telephone set 100 presses a hard key on the telephone set 100. In response to the user pressing the hard key, the confirmation tone attenuation mode is enabled in step 315. In step 320, the user of the telephone set 100 initiates a telephone call by dialing on the keypad 114. In response to the telephone set 100 being in the confirmation tone attenuation mode, the dialing confirmation tones generated by the user dialing on the key pad 114 and presented to the user via the earpiece are attenuated. During the telephone call, any dialing confirmation tones generated by the user pressing any keys on the key pad 114 will continue to be attenuated while the telephone set is in the confirmation tone attenuation mode. In step 325, a determination is made regarding if the user has pressed the hard key again during the call. If it is determined that the user has not pressed the hard key again, the call continues until step 330. If it is determined in step 325 that the user has pushed the hard key, the attenuation mode is toggled between the confirmation tone attenuation mode and the default mode in step 335, and the call continues until step 330. In step 330, the user hangs up the call. In alternative embodiments, the user may toggle between the confirmation tone attenuation mode and the default mode a multiple of times during a call by pressing the hard key on the telephone set 100. After user hang-up of the call in step 330, the telephone set 100 returns to default mode in step 340. In the default mode, DTMF tones generated by the DTMF tone generator 104 are not attenuated by the confirmation tone attenuator 108, and the dialing confirmation tones are provided to the receiver audio output 112 at substantially the same signal level as the generated DTMF tones. In an alternative embodiment, step 340 is omitted and the telephone set 100 remains in the confirmation tone attenuation mode until the user changes the mode to the default mode. The procedure 300 ends in step 345.

The procedure 300 illustrated in FIG. 3 allows a user of the telephone set 100 to toggle between the confirmation tone attenuation mode and the default mode during a telephone call. For example, an established call can be forwarded to an automated key pad response system where allowing a user to hear DTMF confirmation tones may be desired.

The various steps of procedure 300 have been chosen and described only as exemplary and are not limiting on the illustrative embodiments. An implementation of the illustrative embodiments may alter, combine, delete or augment these steps without departing from the scope of the illustrative embodiments.

Although embodiments of the present embodiments have been illustrated with respect to a telephone set, it should be understood that the principles described herein are applicable to other telecommunication devices. For example, the principles described herein can be applied to computer modems.

The illustrative embodiments can take the form of an entirely hardware embodiment, an entirely software embodiment or an embodiment containing both hardware and software elements. Furthermore, the illustrative embodiments can take the form of a computer program product (e.g., softphone) accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk Current examples of optical disks include compact disk-read only memory (CD-ROM), compact disk-read/write (CD-R/W and DVD).

Further, a computer storage medium may contain or store a computer-readable program code such that when the computer-readable program code is executed on a computer, the execution of this computer-readable program code causes the computer to transmit another computer-readable program code over a communication link. This communication link may use a medium that is, for example without limitation, physical or wireless.

The above description has been presented for purposes of illustration and description, and is not intended to be exhaustive or limited to the illustrative embodiments in the form disclosed. Many modifications and variations will be apparent to those of ordinary skill in the art.

What is claimed:

1. A method for attenuating a dialing confirmation tone comprising:
 receiving, at a telephone, a first key sequence from a user on a keypad of the telephone;
 entering a program mode in response to receiving the first key sequence;
 receiving, at the telephone, an enable signal comprising a second key sequence while in the program mode;
 enabling a dual-tone multiple frequency (DTMF) attenuation mode in response to receiving the enable signal;
 receiving a third key sequence from the user on the keypad of the telephone, the third key sequence initiating a telephone call;
 generating at least one DTMF tone in response to the third key sequence;
 communicating the at least one DTMF tone to a telephone line;
 attenuating, in response to enabling the DTMF attenuation mode, a signal level of the at least one DTMF tone by a predetermined amount to produce at least one attenuated dialing confirmation tone;

communicating the at least one attenuated dialing confirmation tone to an audio output device in communication with the tactile user input device; and after the telephone call is disconnected, automatically returning to a default mode in which DTMF tones are not attenuated.

2. The method of claim 1, further comprising:

receiving a disable signal from the tactile user input device; and mute the at least one DTMF tone to the audio output device while still providing the at least one DTMF tone to the telephone line.

3. The method of claim 1, wherein the at least one DTMF tone is muted in response to a selection of a dedicated key by a user.

4. The method of claim 1, wherein communicating the at least one DTMF tone to a telephone line includes communicating an analog signal over an analog telephone line, and wherein the signal level returns to a default signal level once a call associated with communicating the at least one DTMF tone to a telephone line has ended.

5. The method of claim 1, wherein communicating the at least one attenuated dialing confirmation tone to the audio output device includes communicating the at least one attenuated dialing confirmation tone to the audio output device of a telephone set.

6. The method of claim 1, wherein attenuating the signal level by a predetermined amount includes attenuating the signal by at least 50dB.

7. The method of claim 1, further comprising:

displaying an attenuation indicator, the attenuation indicator indicating to a user that attenuation of at least one DTMF tone is being performed, wherein the predetermined amount was previously set by the user.

8. An apparatus for attenuating a dialing confirmation tone comprising:

a dialing tone generator configured to:

generate at least one dual-tone multiple frequency (DTMF) tone; and provide the at least one DTMF tone to a telephoned to initiate a telephone call;

a confirmation tone attenuator configured, in a first mode of operation, to:

receive a first key sequence from a user on a keypad;

enter a program mode in response to receiving the first key sequence;

receive an enable signal comprising a second key sequence while in the program mode;

enable a DTMF attenuation mode in response to receiving the enable signal;

attenuate, in response to enabling the DTMF attenuation mode; a signal level of the at least one DTMF tone by a predetermined amount to produce at least one attenuated dialing confirmation tone in response to receiving the enable signal;

provide the at least one attenuated dialing confirmation tone to an audio output device; and after the telephone call is disconnected, automatically return to a default mode in which DTMF tones are not attenuated.

9. The apparatus of claim 8, wherein the confirmation tone attenuator is further configured, in a second mode of operation, to:

receive a disable signal from the tactile user input device; and mute the at least one DTMF tone to the audio output device while still providing the at least one DTMF tone to the telephone line.

10. The apparatus of claim 8, wherein the telephone line is an analog telephone line, and wherein the signal level returns to a default signal level once a call associated with communicating the at least one DTMF tone to a telephone line has ended.

11. The apparatus of claim 8, further comprising an attenuation indicator to indicate to a user that attenuation of at least one DTMF tone is being performed, wherein the predetermined amount was previously set by the user.

12. The apparatus of claim 8, wherein the audio output device includes an earpiece of a telephone set.

13. The apparatus of claim 8, wherein the predetermined amount of attenuation is at least 50dB.

14. The apparatus of claim 8, wherein the apparatus is a telephone set, and wherein the predetermined amount of attenuation is set by the user.

15. A computer usable program product in a non-transitory computer readable medium storing computer executable instructions for attenuating a dialing confirmation tone that, when executed, cause at least one processor to:

receive a first key sequence from a user on a keypad;

enter a program mode in response to receiving the first key sequence;

receive an enable signal comprising a second key sequence while in the program mode;

enable a dual-tone multiple frequency (DTMF) attenuation mode in response to receiving the enable signal;

receiving a third key sequence from the user, the third key sequence initiating a telephone call;

generate at least one DTMF tone in response to the third key sequence;

provide the at least one DTMF tone to a telephone line;

attenuate a signal level of the at least one DTMF tone by a predetermined amount to produce at least one attenuated dialing confirmation tone in response to receiving the enable signal;

provide the at least one attenuated dialing confirmation tone to said user via an audio output device; and after the telephone call is disconnected, automatically return to a default mode in which DTMF tones are not attenuated.

16. The computer usable program product of claim 15, wherein the executable instructions further cause the at least one processor to:

receive a disable signal from the tactile user input device; and mute the at least one DTMF tone to the audio output device while still providing the at least one DTMF tone to the telephone line.

17. The computer usable program product of claim 15, wherein the executable instructions further cause the at least one processor to display an indicator of attenuation being performed on the at least one DTMF tone, and wherein the predetermined amount was previously set by the user.

18. The computer usable program product of claim 15, wherein the predetermined amount of attenuation is at least 50dB, and wherein the signal level returns to a default signal level once a call associated with communicating the at least one DTMF tone to a telephone line has ended.

* * * * *